United States Patent [19]

Hyder et al.

[11] Patent Number: 5,983,274
[45] Date of Patent: Nov. 9, 1999

[54] CREATION AND USE OF CONTROL INFORMATION ASSOCIATED WITH PACKETIZED NETWORK DATA BY PROTOCOL DRIVERS AND DEVICE DRIVERS

[75] Inventors: Jameel Hyder, Redmond; Kyle Brandon, Seattle, both of Wash.

[73] Assignee: Microsoft Corporation, Redmond, Wash.

[21] Appl. No.: 08/852,937

[22] Filed: May 8, 1997

[51] Int. Cl.$^6$ .................................................. G06F 13/00
[52] U.S. Cl. ........................ 709/230; 709/250; 709/300
[58] Field of Search .................................. 709/207, 230, 709/231, 232, 236, 238, 250, 300, 301, 302; 370/469, 903

[56] References Cited

U.S. PATENT DOCUMENTS

| | | | |
|---|---|---|---|
| 5,526,483 | 6/1996 | French et al. | 395/182.02 |
| 5,630,061 | 5/1997 | Richter et al. | 709/227 |
| 5,634,006 | 5/1997 | Baugher et al. | 709/228 |
| 5,719,942 | 2/1998 | Aldred et al. | 380/49 |
| 5,799,017 | 8/1998 | Gupta et al. | 370/419 |

OTHER PUBLICATIONS

Michael W. Garwood, et al, Unix Streams: If Modularity and Portability Are Part of Your Unix Problems, Dr. Dobb's Journal of Software Tools, vol. 14; No. 1: p. 50 (Jan. 1989).
Brian Ramsey, Streamlining Protocols for Networks, Electronics Engineering Times, Embedded Systems, p. 80, part 3:networks (Jun. 5, 1995).
Tom Williams, Unix–Style Communications for Embedded Systems; Metasphere's Embedded Streams Software; Product Announcement, Computer Design, vol. 31; No. 10; p. 140 (Oct. 1992).
Michael Day, Unix Breakthroughs Create LAN Products, LAN Times, vol. 8; No. 3; p. 69 (Feb. 4, 1991).
Jim Carr, for Unix Users: NSF and RFS Provide File Access Across Networks; Unix Local Area Networks; Networks File System, Remote File Sharing; Includes Related Article on Sun's Guides to Who Is Selling OCN/NFS, The Local Areas Networks Magazine, vol. 5; No. 2; p. 76 (Feb. 1990).
Eric Hindin, Unix System V Version with Interface Between Application and Networks Has Users Talking; Computer Network Protocols; Connectivity, PC Week, vol. 4; p. C11 (Jan. 27, 1987).

*Primary Examiner*—Viet D. Vu
*Attorney, Agent, or Firm*—Workman, Nydegger, Seeley

[57] ABSTRACT

A method, computer program product, and data structure that allows any software component processing network data to communicate control information to and cooperate with another software component by associating control information with a packet of network data. The present invention associates control information with the network data upon which the control information will operate by appending one or more control data structure to a packet descriptor that is common to all software components processing the network data. Furthermore, the control data structure is "tagged" with a class ID value that allows all concerned software components to recognize and utilize the control information. In this manner, any software component may cooperate with and communicate to another software component that processes the network data regardless of any intervening software components.

22 Claims, 7 Drawing Sheets

CREATION AND USE OF CONTROL INFORMATION ASSOCIATED WITH PACKETIZED NETWORK DATA BY PROTOCOL DRIVERS AND DEVICE DRIVERS

BACKGROUND OF THE INVENTION

1. The Field of the Invention

The field of the invention generally is network packet processing on a general purpose computer system. More particularly, the field of the invention relates to a personal computer connected to a communications network and having a layered architecture for handling packets of network data that roughly corresponds to the ISO model. Specifically, the invention relates to ways of associating control information to the network data that may be used by different software components processing the network data.

2. Present State of the Art

The effectiveness of general purpose stand alone computers, such as the personal computer found in most office environments and laptop computers increasingly used by professionals requiring portability, has been substantially improved by allowing communications between machines over a communications network. Such networking of computers allows the sharing of resources found on one computer with other computers in the network. For example, storage areas having files, printers, modems, and other resources may all be advantageously shared.

Data that is shared between computers is sent in packets across the physical network connection and read by destination computers. Such packetized network data may be requests for shared resources, data, such as a file, or other information that must be communicated from one computer to the other. As used herein, the term "network data" refers to data or information that is actually transmitted over the communications network between different computers.

On a particular computer or node of the network, a network interface card (NIC) or network card monitors the physical communications channel for packets destined for that computer as well as transmits packets of network data destined for other computers. Software components run on the node computer under direction or control of the operating system or architecture for managing and controlling the network card operations. Furthermore, other software components exist to further abstract the network communications channel and provide more and more general networking interfaces for higher layers using their services. The layered approach allows compartmentalization and easier development of network applications.

One model used to provide a structure for layered software component development is the seven-layer ISO model that is well known in the art. While actual implementations of the ISO model do not necessarily rigidly isolate each particular layer as a separate component exposing its own interface to layers above and below, the concepts of the model are generally applicable. With respect to the present invention as currently embodied, the lower layers of the ISO model are at issue, namely, the data link layer implemented by a network card device driver, and the transport and network layers implemented as a transport protocol driver.

Lower level networking functions, such as are discussed throughout this application with respect to controlling a network card and initial processing of packetized network data, are handled by special system software components called drivers that integrate with a host operating system according to a specific architecture and have special privileges for accessing system resources. Throughout this application, reference will be made to the Windows NT® operating system available from Microsoft Corporation and to its specific architecture wherein lies one embodiment of the present invention. Such drivers run in "kernel mode," meaning they have higher privileges and access to system resources than do "user mode" application process threads. While specific reference is made to Windows NT concepts and terminology, those skilled in the art will recognize that many, if not most, operating systems share similarities relevant to the environment of the present invention.

Because there are different types of transport protocols developed over time by different entities for different reasons, there may be different types of transport protocol drivers acting as software components running on a single host computer system in order to provide the necessary networking capabilities for a given installation. Some common transport protocols include TCP/IP, IPX, AppleTalk®, and others. Each transport protocol driver will communicate with one or more individual network card device drivers in order to send network data over a communications network and receive incoming packets from the communications network.

Furthermore, because there are a multitude of network cards provided by numerous manufacturers, there are a corresponding large number of potential network card device drivers. In order to support full connectivity to the transport protocol drivers, each network card device driver must support the ability to communicate with each different type of transport protocol driver. Because of the complexity of many different variations that could conceivably be connected together due to the layered component approach, building such drivers can be a time intensive process and the nature of the different interfaces each driver must use is illustrated in FIG. 1.

FIG. 1 is a block diagram showing the structure of a plurality of network cards, network card device drivers, and transport protocol drivers that each must interact with system resources and a central database or registry having connectivity information in order to operate properly. Furthermore, each transport protocol driver must support each and every network card device driver for which it may be connected and in like manner each network card device driver must support communicating with each and every transport protocol driver to which it may be connected.

If a new transport protocol driver is introduced, each network card device driver wanting to support the new transport protocol driver may require modification to the source code followed by a re-release and distribution of the executable driver code. Likewise, a new network card device driver may also require a similar re-release. Releasing and distributing software is an expensive process that software companies desire to limit as much as possible.

For example, passing network information arriving on network card 20 controlled by network card device driver 22 to the transport protocol driver 24 requires the transport protocol driver 24 and the network card device driver 22 to be fairly complex in terms of programming effort. This may take significant time for a developer or engineer to create. Note that the network card driver 22 must not only interact with the network interface card 20 but also have an interface 26 to the system resources 28 as well as an interface 30 to the registry 32 containing connectivity information. Through such interfaces and the programming entailed therein, the network card device driver 22 will receive an interrupt that a packet has been received or is available for receipt by having the system execute code in an interrupt handling routine previously registered that makes use of system resources such as RAM for storing the packet.

Furthermore, the network card device driver 22 will use the registry interface 30 to access the registry 32 connectivity information for determining which transport protocol driver(s) will receive the packetized network information. For purposes of this example, the transport driver 24 is the recipient as illustrated by connecting line 34. Note also that the network card device driver 22 must support or be able to communicate with other transport protocol drivers since a variety exist and it is not known at development time which transport protocol driver will be indicated in the control information found in the registry 32 for receiving the network data.

On the other hand, the protocol transport driver 24 must also interface with the system resources 28 and the registry 32 containing connectivity information. Again, in order to support the many available network card device drivers, each transport protocol driver will be a relatively complex software component since the precise network card device driver for interfacing is not known at the time of development.

One advance in the art that has reduced the complexity associated with developing transport protocol drivers and network card device drivers is that of an integrating component that provides an abstracted interface to transport protocol drivers developers and to network card device driver developers. FIG. 2 is a block diagram showing the introduction of an integrating component that reduces the complexity of transport protocol driver development and network card device driver development. In such an environment, an integrating component 36 will have a registry interface 38 for accessing a registry 32 of connectivity information and a system resource interface 40 for accessing system resources 28. Therefore, development of the network card device driver 42 for controlling network card 20 is greatly simplified. The network card device driver 42 must only support an interface 44 to the integrating component 36. In like manner, the transport protocol driver 46 is also further simplified as only an interface 48 to the integrating component 36 may be supported.

The complexity of interfacing directly with the system resources 26 and the registry 32 of connectivity information is now handled by the integrating component 36. Furthermore, the integrating component provides an interface to developers incorporating many services and functionality that will be common to network card drivers and transport protocol drivers allowing the drivers to be developed more efficiently.

Another inherent benefit is that all routing of packets between transport protocol drivers and network card device drivers is managed by the integrating component. A particular transport protocol driver or network card device driver does not need to know the specific interface of the other components processing the same network packet. In other words, any network card device driver written to the integrating component 36 will be able to communicate with any available transport protocol that is also written to the integrating component 36 as determined by the connectivity information contained in the registry 32 and vice versa with respect to transport protocol drivers communicating with network card device drivers.

Besides providing quicker transport network card device driver development, the use of an integrating component 36 also facilitates multi-platform support. The integrating component interface may be supported on many different platforms, effectively encapsulating the details of actual interfacing with the a particular operating system and environment. A driver developer generally needs to write the driver only one time and simply recompile the driver on any system that has the integrating component 36 supported thereon.

One technology for integrating network card device drivers to transport protocol drivers is the Network Driver Interface Specification (NDIS) technology implemented on the Windows NT operating system as the NDIS wrapper device driver. The NDIS technology is also supported on other systems, such as the Windows95® operating system, in order to support cross platform support of network card device drivers and transport protocol drivers. The integration component manages all interaction with system level services and hardware to further reduce development complexity of connected drivers. For example, the NDIS wrapper manages initial interrupt processing, system memory allocations to connected drivers, allocation to other hardware resources, etc. as well as providing packet routing capability between network card device drivers and transport protocol drivers.

While many benefits accrue from the use of an integrating component, such as the NDIS wrapper, certain problems are introduced requiring resolution. Because both of the transport protocol drivers and the network card device drivers are written to the integrating component, they do not directly communicate with each other nor have knowledge of what software components will receive packets further down in processing since that information is determined by the system specific connectivity information typically set by a system administrator or as a result of loading respective transport protocol drivers and network card device drivers.

There are many instances where information between a transport protocol driver and a network card device driver should be communicated in order to properly process the network data either prior to transmitting the data over the network or after receiving the data from the network. For example, prioritized packet delivery information originating at upper layers and arriving at the transport protocol driver should be communicated through the integrating component to the network card device driver so that a higher priority packet may be sent out of FIFO sequence by the network card device driver. The problem of communicating through the integrating component is exacerbated when the integrating component manages passing network data through one or more intermediary software components.

What is needed and what would be an advancement in the art would be a way of allowing user defined data related to the processing of packetized network data to be conveniently communicated through the integrating component and be associated with packetized network data to be processed. Such a mechanism must also be created in such a manner that the benefits of the integrating component are not lost, negated, or in any way compromised. Furthermore, communication between software components must occur without regard to how many such components process a particular packet of network data.

SUMMARY AND OBJECTS OF THE INVENTION

It is an object of the present invention to associate control information with a packet of network data that can be used to control processing of the data or provide other information regarding the data.

It is another object of the present invention to allow communication of control information between different components that may not have a direct connection to each other.

It is a further object of the present invention to provide a network packet having network data and associated control information that sequentially passes through a plurality of software components allowing a first component to set the control information, passing the packet through one or more other components, and having a second component utilize the information regardless of how many other components have processed the packet.

It is an object of the present invention to provide a data structure allowing control information to be associated with network information.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and data structure for associating control information with packetized network data is provided.

The present invention overcomes the limitations in the prior art by providing a control data structure that contains the control information that is set by one software component and used by another software component. Furthermore, the control data structure is separate from the packetized network data that will be transmitted across (or received from) the communications network since the control information itself will not be transmitted with the network data.

A packet descriptor is used as an integrating data structure that will point to both the network data held in a buffer in host memory as well as a series of one or more control data structures. A component, such as a network card device driver or a transport protocol driver, may add some special control information and deliver the packet to an integrating component for transfer to the next component without knowledge of the nature of any later components. It is incumbent upon a later component to read or access the control data structures chained to the packet descriptor (integrating data structure) in order to determine if there is any relevant control information that it may use.

The control data structure consists of a class ID field, a pointer or offset to the next control data structure, if any, and a variable-length, free-form data area that is defined by the value in the class ID field. Therefore, a software component that receives the packet for processing will use a pointer in the packet descriptor to access the series of control data structures and read the class ID field of each in order to recognize those control data structures having control information that it understands and can utilize.

One example given by way of illustration is that of prioritized packet delivery over a communications network. Some higher level component, such as a redirector, can communicate to a transport protocol driver that a packet of network data is to be delivered at the highest possible priority contrary to the assumed FIFO processing of packets for transmission across the communications network. Such priority information would be included in a control data structure appended to the packet descriptor having the associated network data. Naturally, the control data structure would have a unique value assigned into the class ID field so that a later component could access and utilize the priority information.

After passing through the integrating component and possibly being processed by a number of different components, the packet will arrive at the network card device driver for actual transmission across the communications network. The network card device driver will recognize the value in the class ID field of the control data structure having the priority information and determine that the packet must go out onto the communications network as soon as possible rather than in the normal FIFO fashion and make it so.

Those skilled in the art will recognize that many other applications may make use of associated control information for processing network data as disclosed herein. For example, encryption applications, processing peculiarities germane to newer communication mediums, such as infrared, cellular, and other wireless technologies, etc. provide ripe opportunities for exploiting the present invention.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As used herein, the term "software component" refers to any set of executable instructions separately cognisable to an operating system that manages a computer system. Examples would include separate processes or threads, application programs, system device drivers, and any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "driver" refers to software driver programs running in a privileged system environment and that is interact with an I/O subsystem as part of an operating system architecture. Such drivers are distinguishable from application programs and other software.

As used herein, the term "direct call linkage" refers to a function call interface. The actual address resolution may be done at compile time through traditional linkers or may be done dynamically by system components when using such entities as dynamic link libraries or export libraries. An invocation session is created when a subroutine is initially called and ends when that particular subroutine ends. An Application Programming Interface (API) is a set of subroutines provided by one software component so that relevant services may be uniformly accessed.

As used herein, the term "messaging" refers to sending uniform message blocks between software components in order to communicate therebetween. One example would be the I/O Request Packet (IRP) structure used in the Windows NT I/O system to communicate between different drivers.

Figure 1:
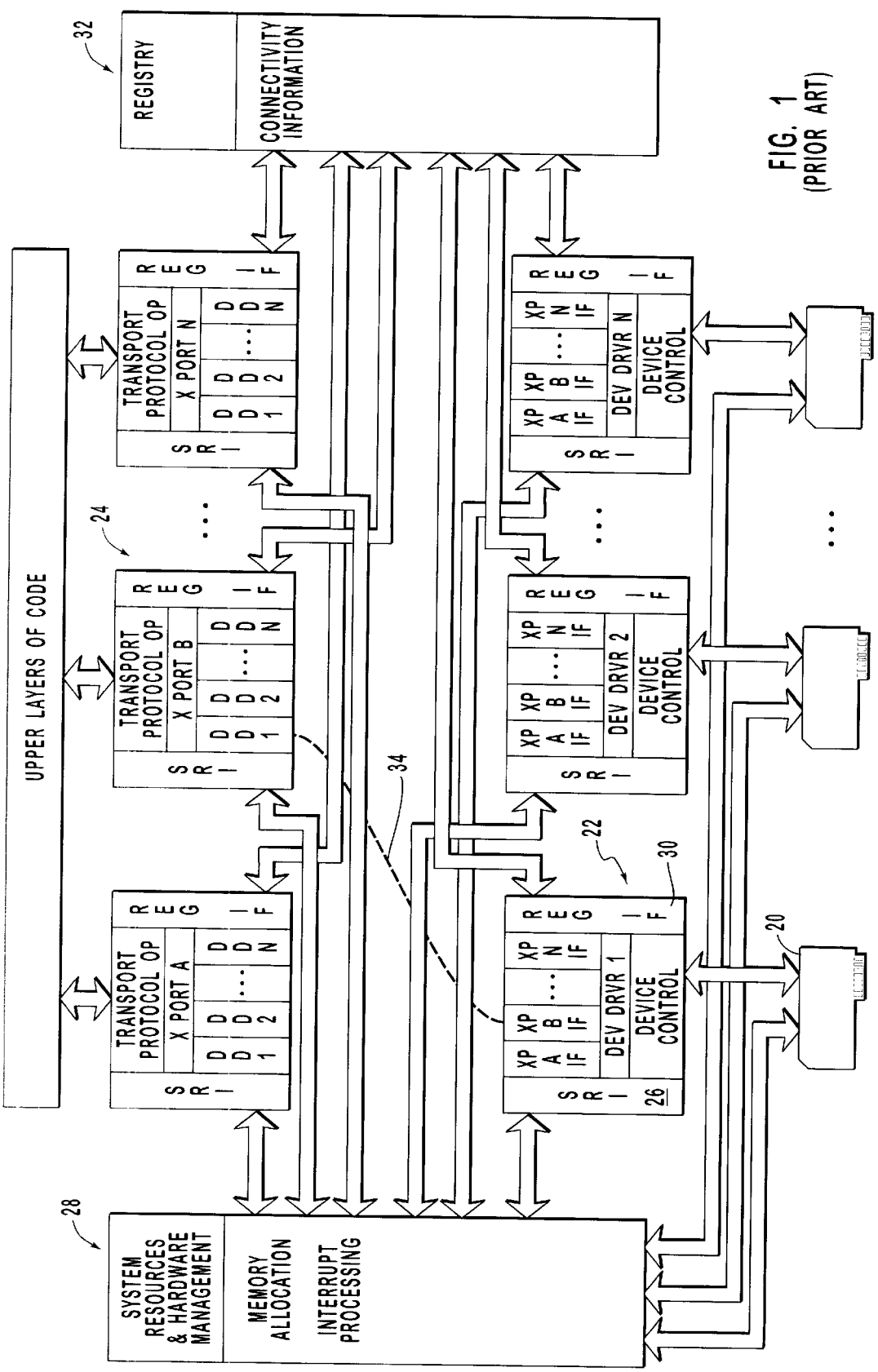
FIG. 1 is a block diagram showing the environment and interfacing of network card device drivers and transport protocol drivers as existing in the prior art.
Figure 2:
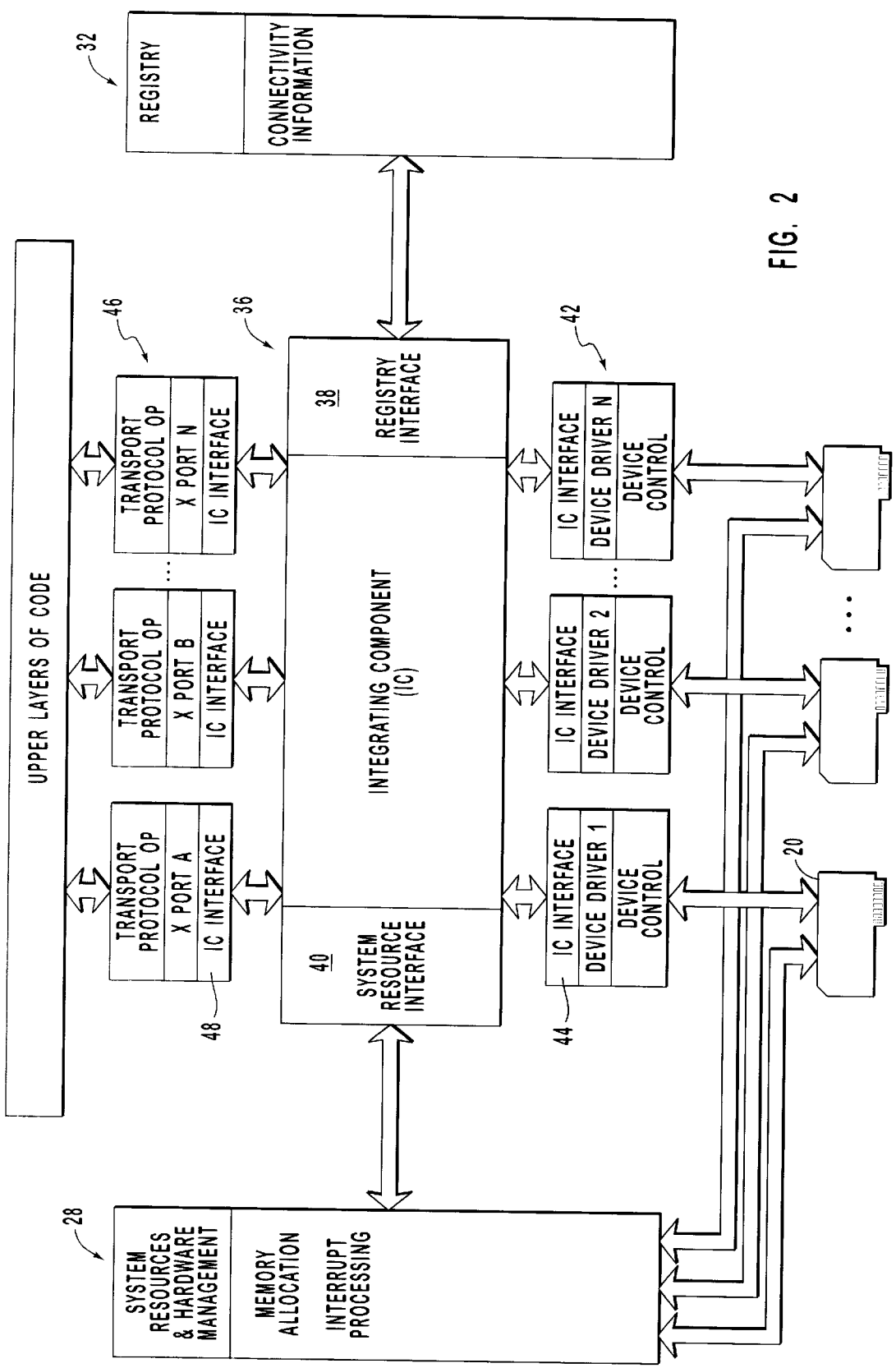
FIG. 2 is a block diagram showing the introduction of an integrating component that reduces the development complexity of network card device drivers and transport protocol drivers that constitutes the current environment of the present invention.
Figure 3:
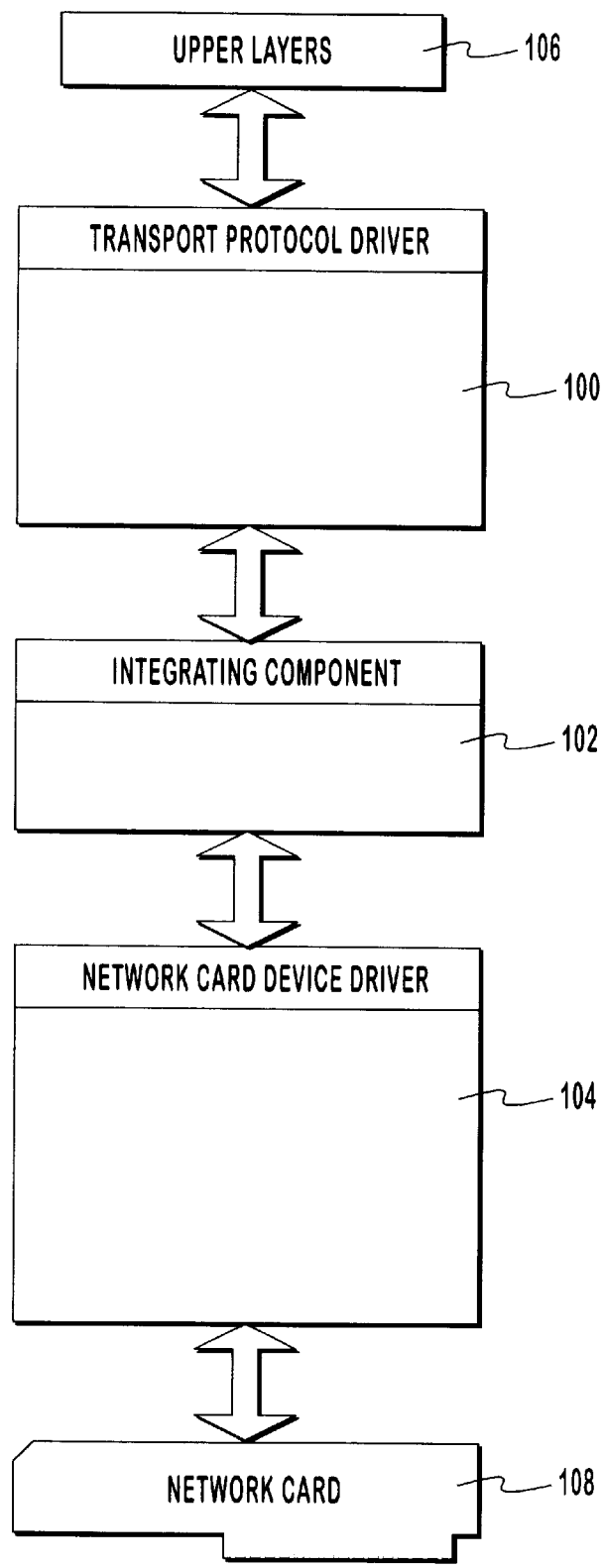
FIG. 3 is a block diagram showing the layered software approach and in particular illustrating that any communication between the transport protocol driver and the network card device driver is made through the integrating component.

Referring now to FIG. 3 a block diagram is shown illustrating the relationship between the transport protocol driver 100, an integrating component 102, a network card device driver 104, and a network card 108. Note that the transport protocol driver 100 will communicate with other software components collectively referred to as "upper layers" 106. Also, the network card device driver 104 will communicate with and control a network card 108. All inter-communication is shown by respective arrows between the different components.

For sending network data from the upper layers 106, the transport protocol driver 100 will allocate a packet data structure from the integrating component 102, fill the data structure with network information and control information according to the present invention, and send it down through the integrating component 102 to the network card device driver 104 for transmitting the network data on the network interface card 108. In like manner, for a packet received from the network interface card 108, the network card device driver 104 will allocate a packet data structure from the integrating component 102, fill it with the network data and control information according to the present invention, and send it through the integrating component 102 to the transport protocol driver 100 for communication to the upper layers 106. Both of these processes will be explained in more detail hereafter.

Figure 4:
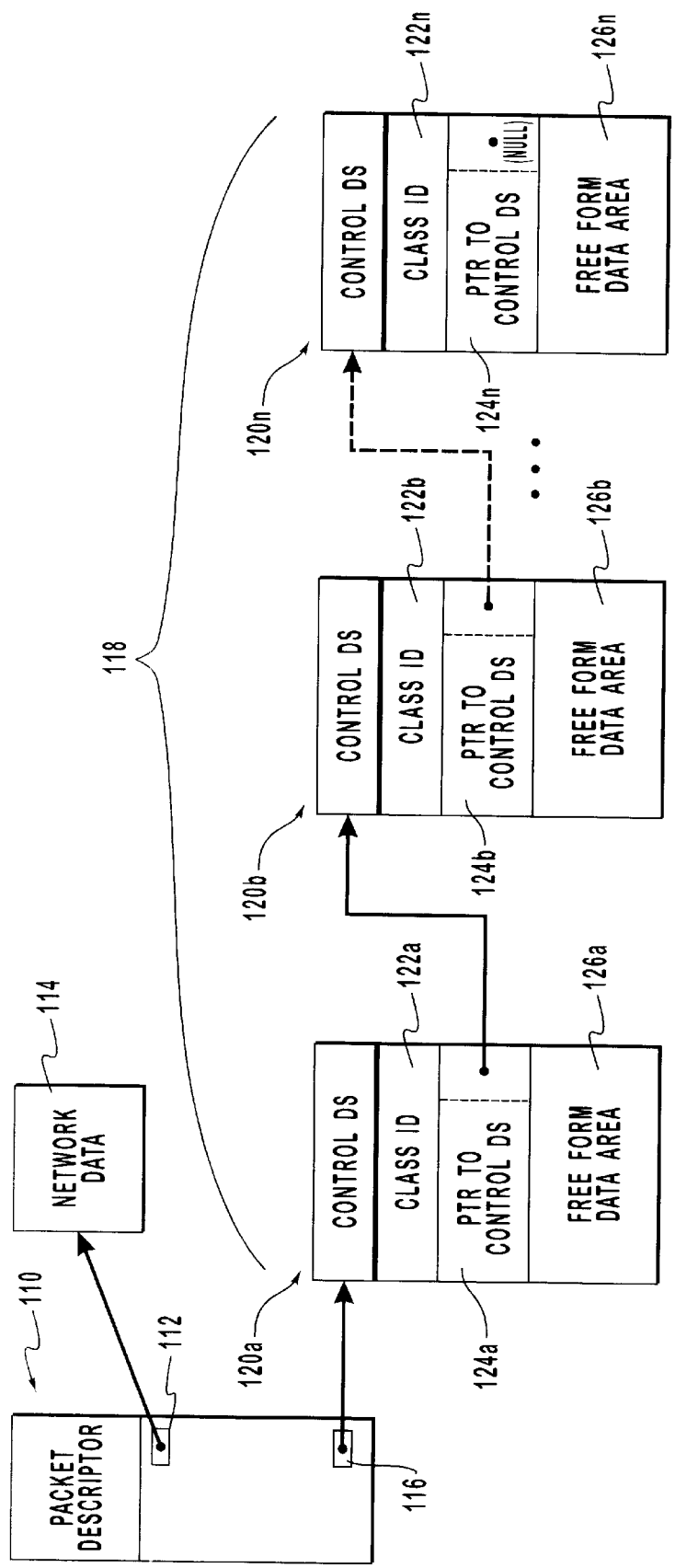
FIG. 4 is a block diagram illustrating a packet data structure according to one embodiment of the present invention wherein control information is associated with network data.

Referring now to FIG. 4, one embodiment of a data structure of the present invention is shown. A packet descriptor 110 has associated therewith a number of fields containing information regarding the packet of network data that will be filled by a transport protocol driver 100 or a network card device driver 104. Note that the packet descriptor 110 is initially requested from and allocated by the integrating component 102 (See FIG. 3).

The packet descriptor 110 information includes, but is not limited to, private areas for both a network card device driver and a transport protocol driver, a flag area that can be used and whose meaning is defined by cooperating transport protocol driver(s) and network card device driver(s), the total length of a packet, physical pages contained in a packet of information, virtual address ranges of the network data contained in the packets, etc. Also, a pointer 112 to the actual network data 114 contained in a buffer will be included.

Those skilled in the art will note that the network data 114 may contiguously reside in a memory buffer or may be accessed by indirect means or structures such as Memory Descriptor Lists (MDL's) that map segments of virtual memory and their physical page size. In either case, all memory is requested by the transport protocol driver 100 or the network device driver 104 through a interface call to the integrating component 102 which in turn will manage allocating memory using the appropriate system conventions. For purposes of the present invention, it is only necessary to know that the network data 114 is accessible from the packet descriptor 110.

Also included in the packet data structure is a pointer 116 to a series of control data structures 118. Each control data structure in the series of control data structures 118 is created by an originating software component, such as the transport protocol driver, the network card device driver, or other component that in some way processes the packet. Furthermore, each control data structure is filled with control information that will eventually be used by another software component other than the component creating the data structure as the packet descriptor 110, including all data referenced therefrom, is passed or sent to other software components by means of the integrating software component 102 (See FIG. 3) as will be explained in more detail hereafter. Note that the packet descriptor 110 functions as an integrating data structure to tie together the network data 114 and the series of control data structures 118.

Control data structure 120a is broken into three main components and is used as a general example of each control data structure in the series of control data structures 118. First, a class ID field 122a identifies the type or kind of control data found in this particular control data structure. The class ID field 122a value is used by a receiving software component so that it may identify those control data structures that it needs or understands.

Next, the control data structure 120a has a pointer 124a to the next control data structure within the series of control data structures 118. This allows multiple control data structures to be chained together in order to form the series of chained data structures 118 thereby allowing different software components to communicate control information destined for other software components that will use the same packet identified by the packet descriptor 110 regardless of the actual order that each component processes the packet.

Note that the pointer 124a may be an absolute pointer, or as implemented in a preferred embodiment, a numeric offset to the beginning to the next control data structure. Using an offset allows the series of control data structures 118 to lie contiguously in a portion of memory.

Finally, the control data structure 120a has a free-form data area 126a with a format that is determined by the cooperating software components according to the functionality being implemented. It is in this free-form data area 126a where priority information would be kept, for example, in order to implement a prioritized packet transmission scheme.

All of the individual control data structures 120a–120n within the series of control data structures 118 have the same fields as explained with respect to control data structure 120a. Those skilled in the art will recognize that other implementations of a control data structure containing control information and associated with a packet of network data will fit in harmony with the present invention to allow the control information to be used by only those software components to which it is relevant regardless of other components that may process the packet of network data.

Figure 5:
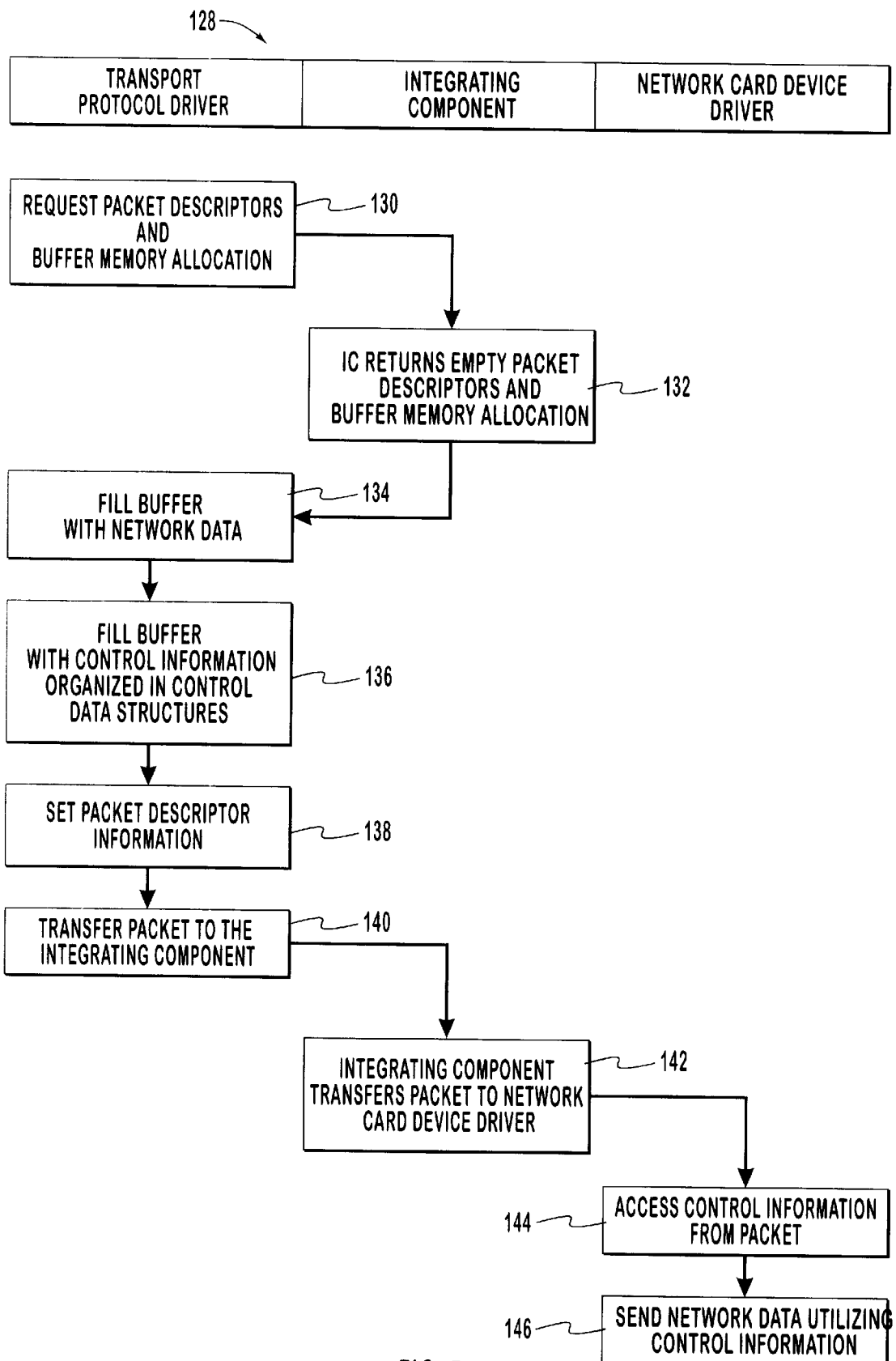
FIG. 5 is a flow chart showing how control information is associated with network data using the packet data structure of FIG. 4 wherein a transport protocol driver initially allocates and fills the packet with network data and control information and a network card device driver accesses the control information for transmitting or otherwise processing the network data.

Referring now FIG. 5, a flow chart is shown depicting the processing steps a protocol driver takes for associating control information with the network data according to the present invention. Such an association allows a network card device driver easy access to the control information that can, in turn, be used for processing network data in some form prior to transmission onto a communications network. Above the flow chart is a bar 128 that indicates when the transport protocol driver, the integrating component, and the network card device driver are actually executing. The steps that are performed by the above-identified software components will lie directly below those headings under the bar 128.

The transition between the different software components may occur a number of different ways. In one currently preferred embodiment, the transition occurs through a subroutine call on a direct call linkage between the components. The linkage is effectuated during loading and initialization of the drivers wherein the transport protocol driver 100 and the network card device driver 104 make known or "register" to the integrating component 102 entry points into the respective driver code. Other software components may also be known to the integrating component 102 so that a plurality of software components will receive a particular packet. Those skilled in the art will see that other ways exist for communicating between the different drivers including different messaging schemes. One example of messaging between software components would be passing an IRP or similar data structure between the different driver components through the standard system conventions in the NT operating system.

The flow chart will be explained in conjunction with the block diagram of FIG. 3 and the packet structure of FIG. 4. At step 130, the transport protocol driver 100 will request from the integrating component 102, by means of a direct call linkage, one or more packet descriptors and buffer memory for holding network data 114. This request is made to the integrating component 102 since all interaction with the system is abstracted in order to reduce the development complexity of the transport protocol driver 100 as well as allow sharing and communication of the same packet information between transport protocol driver 100 and the network card device driver 104.

At step 132, the integrating component 102 will make the appropriate operating system call(s) in order to receive a memory allocation for the empty packet descriptors and buffer allocations and return the pointers thereof to the transport protocol driver 100. Note that steps 130 and 132 may be performed during transport protocol driver initialization and the buffer memory and packet descriptors may be reused as necessary by the transport protocol driver 100 during the course of normal operations.

At some point during processing, the transport protocol driver 100 will fill the buffer memory with network data 114 for transmission by the network card 108 onto a communications network. In a currently preferred embodiment, the buffer memory will be a group of MDL's according to the Windows NT operating system architecture.

At step 136, transport protocol driver 100 will fill the buffer memory with one or more control data structures having therein particular information for use by another software component relative to the processing of the network data 114. Note that the origin of such information may be from the upper layers 106 of software components "above" the transport protocol driver 100. One example of such data would be priority information that will be utilized by the network card device driver 104 for sending high priority packets of network data out of sequence from when received.

Finally, at step 138, all packet descriptor information that has not already been set or prepared by the transport protocol driver 100 is set. Note that steps 134, 136, and 138 may be performed in any order and the steps essentially prepare a packet of network data with the associated control information that may then be passed to the network card device driver 104 (or other software component) through the integrating component 102. Furthermore, such a packet will be organized according to the packet structure shown in FIG. 4.

The transport protocol driver 100 then sends or transfers the packet to the integrating component 102 at step 140 by making a subroutine call since the two components are associated with a direct call linkage. In like manner, the integrating component 102 will send or transfer the packet to the network card device driver at step 142 by making a subroutine call to an entry point previously registered with the integrating component 102. The integrating component 102 may also do other processing as necessary.

At step 144, the network card device driver 104 accesses the control information stored in the control data structure (e.g., control data structure 120a) referenced or pointed to from the packet descriptor 110 for processing the network data 114. Note that the network card device driver 104 will parse through the series of control data structures 118 that may be present on a packet of network data in order to find the information that it understands by making reference to the class ID field 122a–122n found in each control data structure. Furthermore, the software components utilizing or setting the control data structures with control information must understand or cooperate one with another in order to effectively operate properly.

At step 146, the network card device driver 104 utilizes the control information for either processing the network data in some form or in sending the network data over the communications network or both. For example, at this point the priority information for a particular packet would be utilized to send a high priority packet out of normal first-in-first-out (FIFO) sequence.

Figure 6:
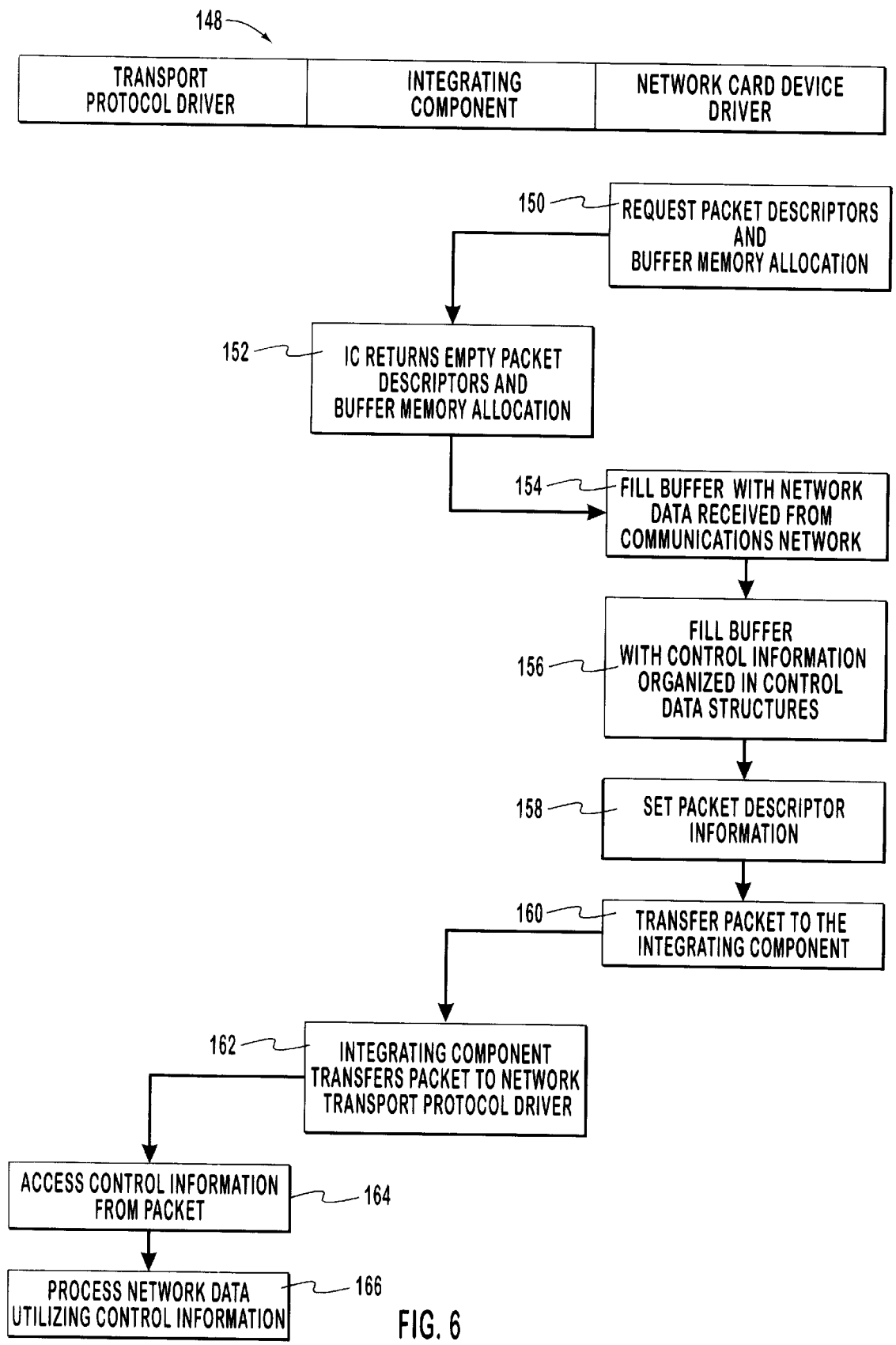
FIG. 6 is a flow chart showing how control information is associated with network data using the packet data structure shown in FIG. 4 wherein a network card device driver initially allocates and fills the packet with network data control information while a transport protocol driver accesses the control information and uses it for processing the network data in some form.

Referring now to FIG. 6, another flow chart is presented showing the association of control information with a packet of network data by the network card device driver upon initial receipt of the network data from the communications network. As before, the block diagram of FIG. 3 will be used to reference the constituent software component while the data structure shown in FIG. 4 illustrates the type of data structures that make up a packet as used in a currently preferred embodiment of the present invention.

As before in connection with the flow chart of FIG. 5, a bar 148, divided into three headings corresponding to the different software components, will be used to indicate which component code is operating during the flow of events. Beginning at step 150, the network card device driver 104 will make a request to the integrating component 102 for a packet descriptor and a quantity of buffer memory. Again, due to the abstraction provided by the integrating software component 102, all allocations of system resources come through the integrating software component 102 which will then interact with the operating system for resources.

The integrating software component returns empty packet descriptors and buffer memory allocation at step 152. The nature of the negotiation for packet descriptors (see packet descriptor 110 of FIG. 4) and the receipt of buffer memory reserved for the requesting entity such as the network card device driver 104 can be handled in preliminary fashion before receiving actual network data off of the communications network by allocating a reusable buffer pool and a reusable packet descriptor pool during driver initialization. In other words, buffer data and a set of packet descriptors may be sitting and available for the network device driver 104 to use without requiring interaction with the operating system through the integrating component 102.

At step 154, the network card device driver 104 has been notified that data is available from the communications network and will fill the buffer memory with that data in order to prepare a packet for transmission up to a transport protocol driver 100 and the upper layers 106. While the preferred processing method involves taking the network data straight from a communications network into the buffer memory found on the host computer system, some network cards, particularly older models, may have on-board memory buffers that hold the network data before it is transferred into host memory.

Depending on the type of network card or network interface device, control information relevant to the processing of the network data 114 will be associated in the packet descriptor 110 by a reference or pointer 116 to one or more control data structures 120a–120n. The network card device driver will fill in the class ID field data 122a for the data and place any control information into the free-form data area 126. The pointer field 124a will be left at zero if no other data control structure are to be chained together or will include a numerical offset corresponding to the size of the control information residing in the free-form data 126a so as to "point" to the next free location in the buffer memory containing the chained control data structures 126a–126n.

Again, the control information is destined for receipt by the transport protocol driver 100 for communication to upper layers 106 residing above the transport protocol driver 100, or other software components known to the integrating component 102. Also, the control information is identified and known by all software components to which it pertains (e.g., a network card driver device 104 and transport protocol driver 100) by means of the unique class ID filed 122a of the control data structure 120a.

The rest of the packet descriptor information is then set at step 158 at which point the packet is ready for transfer to the transport protocol driver 100. Note that steps 154, 156, and 158 representing the mechanics of preparing a packet for transfer may be done in any order, according to a particular implementation.

Finally, at step 160 the packet is transferred by the network card device driver 104 to the integrating component 102 by means of a direct call linkage. As explained previously, other forms of communication between the different software components may be used.

At step 162 the integrating component 102, after receiving the packet for transfer and control of execution, will transfer the packet to the transport protocol driver 100 at step 162. Note that the integrating component may do other processing relevant to the packet such as tracking packet status, etc.

At step 164 the transport protocol driver 100 will receive the packet and then be able to access a relevant control data structure (e.g., control data structure 120a) from a reference contained in the packet descriptor 110. If the transport protocol driver recognizes the value in the class ID field 122a, it will know the format and nature of the control information contained in the free-form data area 126a. Otherwise, the particular control data structure is ignored and processing of the series of control data structures 118 continues until all those control data structures that are relevant to a particular software component are accessed.

Finally, at step 166, the transport protocol driver 100 will utilize the control information taken from the control data structure 120a in processing the network data. Such processing may relate to processing the network data directly or it may be used for routing the data to different software components. At any rate, the control information will be associate with the network data and will be transmitted from the network card device driver 104 to the transport protocol driver 100 and passing through the integrating component 102.

Figure 7:
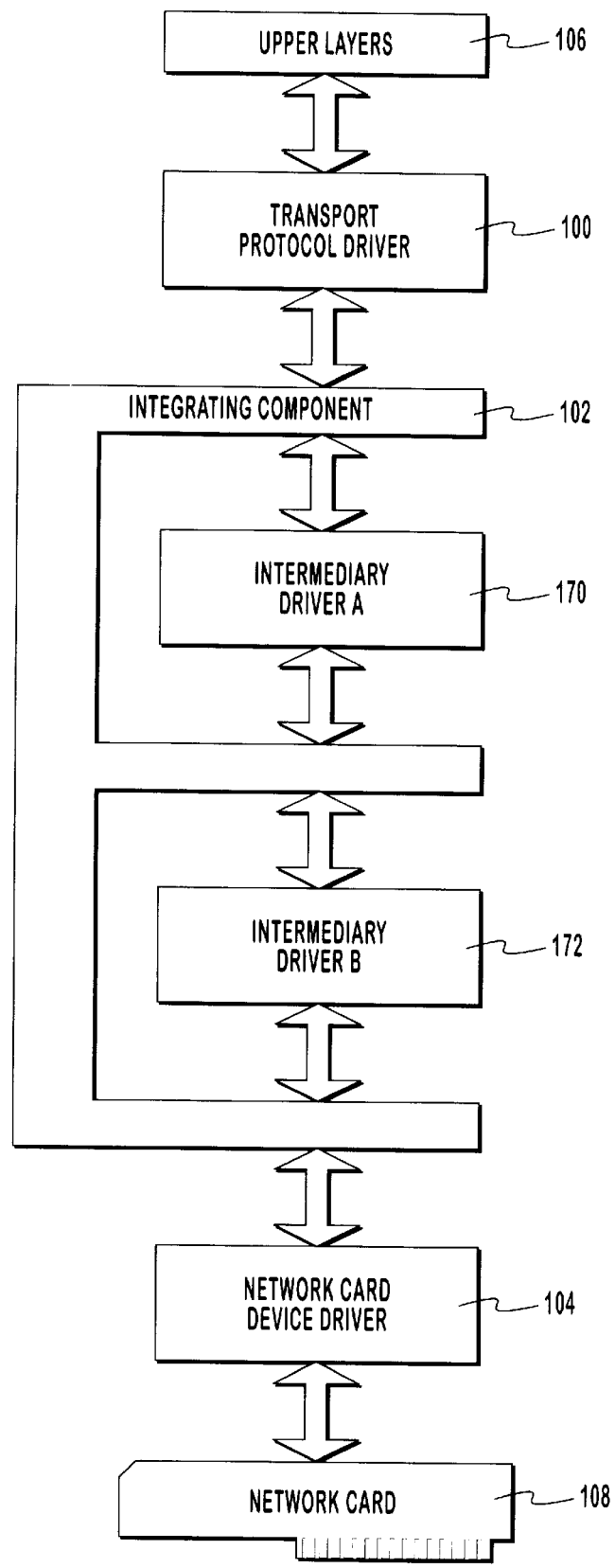
FIG. 7 is a block diagram showing the same components of FIG. 3 with the addition of two intermediary software drivers that communicate with the integrating component.

Referring now to FIG. 7, a block diagram utilizing the components of FIG. 3 is shown with a configuration that introduces an intermediary driver A 170 and an intermediary driver B 172. The two additional software components show that the information contained in a control data structure may be used by other software components on a selective basis. For example, the transport protocol driver 100 may be cooperating with intermediary driver B 172 rather than the network card device driver 104 though both will be processing the packet. In such a case, the network card device driver 104 would not recognize the value of the class ID 122a found in the control data structure 120a.

This provides a flexible mechanism that allows pertinent data to be communicated between any of the software components processing a packet, regardless of how many software components will be processing the packet. For example, when the transport protocol driver 100 has relevant control information that will be understood by the network card device driver 104, it will not matter if intermediary driver A 170, or intermediary driver B, or both are connected into the processing flow. Transport protocol driver 100 will have no knowledge of what is connected since all such connectivity is determined at load time and is only known by the integrating component 102 after reference to a registry of connectivity information. The integrating component 102 will provide "handles" to each driver representing a specific connection during initialization, however, it is the integrating component 102 that will utilize a handle to route a message properly. Furthermore, any other intermediary drivers may be added or there may be no other drivers without effecting the cooperation and communication between the source software component, such as the transport protocol driver 100, and the destination software component, such as the network card device driver 104.

This flexible mechanism would allow the transport protocol driver 100 to cooperate with the network card device driver 104, and the intermediary device driver A 170 to cooperate with both the intermediary driver B 172 and the network card device driver, or any other configuration. Note that the mechanism would continue to operate correctly no matter how many other drivers were connected to the integrating component 102.

The invention has application beyond the processing of network data and applies to any sequentially processed data that may be operated by multiple software components that may not know of each others existence with the connectivity between the software components under the direction of an integrating component. The control information is associated with the data to be processed itself (e.g., a control data structure referenced for a network packet descriptor) and "tagged" (e.g., using a class ID field) so that the relevant software components may cooperate and communicate one with another. Software components will only set or access information that is understood by the class ID field value and will ignore those that do not pertain.

Those skilled in the art will recognize that the methods of the present invention may be incorporated as computer instructions stored as a computer program code means on a computer readable medium such as a magnetic disk, CD-ROM, and other media common in the art or that may yet be developed. Also, computer componentry such as RAM, ROM, EEPROM, etc. may serve as a source of program code means storage or computer readable medium. Combinations of computer readable medium are also contemplated within the scope of this invention. Program code means comprises, for example, executable instructions and data which cause a general purpose or special purpose computer to perform a specific function or functions. Such embodiments of the present invention stored on a computer readable medium constitute an article of manufacture. Additionally, important data structures found in computer hardware memory may be created due to operation of such computer program code means.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for associating control information with packets of network data for use by one or more drivers in processing the packets of network data, the system comprising:
    a protocol driver;
    a device driver;
    an integrating driver that interfaces with the protocol driver and the device driver using defined APIs;
    a computer-readable medium having stored thereon:
        an integrating data structure having associated therewith at least one packet of network data for transmission on a communications network; and
        a control data structure including control information for use in processing the packet of network data;
    means, included in one of the protocol driver and the device driver, for creating a reference in the integrating data structure to the control data structure;
    means, included in said one of the protocol driver and the device driver, for placing control information in the control data structure; and
    means, included in the other of the protocol driver and the device driver, for receiving the integrating data structure, accessing the control data structure through the reference in the integrating data structure, and using the control information for processing the packet of network data.

2. A system as defined in claim 1, wherein said one of the protocol driver and the device driver is the protocol driver and said other of the protocol driver and the device driver is the device driver, and wherein the control information is for processing the packet of network data by the device driver prior to transmitting the packet of network data on the communications network.

3. A system as recited in claim 1, wherein the means for receiving the integrating data structure operates in response to a direct call linkage.

4. A system as recited in claim 1, wherein the means for receiving the integrating data structure operates in response to messaging.

5. A system as defined in claim 1, wherein said one of the protocol driver and the device driver is the device driver and said other of the protocol driver and the device driver is the protocol driver, and wherein the control information is for processing the packet of network data by the protocol driver after the packet of network data has been transmitted to the system from the communications network and prior to passing the packet of network data to an upper software layer included in the system.

6. A system as recited in claim 1 wherein the control data structure comprises a field for identifying the type of control information contained therein.

7. A system as recited in claim 1 wherein the control information comprises a priority designation for delivering network data on a communications network.

8. In an environment having an integrating driver that interfaces, using defined APIs, a protocol driver and a device driver for sequentially processing network data and an integrating data structure, the integrating data structure having associated therewith at least one packet of network data for transmission on a communications network, a method for associating control information with packetized network data for use by the different drivers comprising the steps of:
    one of the protocol driver and the device driver creating a reference in the integrating data structure to a control data structure and placing control information into the control data structure for use in processing the network data;
    sending the integrating data structure to the other of the protocol driver and the device driver; and
    said other of the protocol driver and the device driver receiving the integrating data structure, accessing the control data structure through the reference in the integrating data structure, and using the control information for processing the network data.

9. A method as recited in claim 8, further comprising the step of creating the integrating data structure by a direct call linkage between said one of the protocol driver and the device driver and the integrating driver.

10. A method as recited in claim 8, further comprising the step of creating the integrating data structure by messaging between said one of the protocol driver and the device driver and the integrating driver.

11. A computer-readable medium having computer-executable instructions for performing the steps recited in claim 8.

12. A method as recited in claim 8 wherein the control data structure comprises a field for identifying the type of control information contained therein.

13. A method as recited in claim 8 wherein the control information comprises a priority designation for delivering the network data on the communications network.

14. A method as defined in claim 9, wherein the step of sending the integrated data structure is accomplished by a direct call linkage between said one of the protocol driver and the device driver and the integrating driver followed by a direct call linkage between the integrating driver and the other of the protocol driver and the device driver.

15. A method as defined in claim 10, wherein the step of sending the integrated data structure is accomplished by messaging between said one of the protocol driver and the device driver and the integrating driver followed by messaging between the integrating driver and the other of the protocol driver and the device driver.

16. In an environment having an integrating software driver interfacing a transport protocol driver and a network card device driver for sequentially processing network data prior to transmission on a communications network and an integrating data structure, the integrating data structure having associated therewith network data for transmission on a communications network, a method for associating control information with the network data for use by the different drivers comprising the steps of:

a protocol driver creating a reference in the integrating data structure to a control data structure, the protocol driver placing control information into the control data structure for use in processing the network data;

sending the integrating data structure to a network card device driver; and the network card device driver receiving the integrating data structure, accessing the control data structure through the reference in the integrating data structure, and using the control information for processing the network data prior to transmission on a communications network.

17. A computer-readable medium having computer-executable instructions for performing the steps recited in claim 16.

18. A method as recited in claim 16 wherein the control data structure comprises a field for identifying the type of control information contained therein.

19. A method as recited in claim 16 wherein the control information comprises a priority designation for delivering network data on a communications network.

20. A computer readable medium having a plurality of data fields stored on the medium and representing a control data structure containing information to be used in processing network data by a protocol driver and a device driver that are interfaced by an integrating driver using defined APIs, the control data structure being separate from the network data, the plurality of data fields, comprising:

a first data field containing control information that is set by one of the protocol driver and the device driver and can be accessed by the other of the protocol driver and the device driver, the control information being associated with a particular packet of network data that is to be sequentially processed by both said one and said other of the protocol driver and the device driver; and a second data field containing data representing a type classification of the control information, wherein said other of the protocol driver and the device driver can access the data containing the type classification to determine whether the control information is of interest thereto.

21. A computer readable medium as recited in claim 20 wherein the control information comprises a priority designation for delivering network data on a communications network.

22. A computer readable medium as recited in claim 20, wherein said plurality of data fields further comprises a third data field containing data representing a pointer to another data structure, wherein the other data structure includes another instance of said first data field and said second data field.

* * * * *

UNITED STATES PATENT AND TRADEMARK OFFICE
CERTIFICATE OF CORRECTION

PATENT NO. : 5,983,274
DATED : November 9, 1999
INVENTOR(S) : Jameel Hyder, Kyle Brandon It is certified that error appears in the above-identified patent and that said Letters Patent is hereby corrected as shown below:

Col. 4, ln. 4: after "with" and before "a" delete [the]

Col. 7, ln. 28: after "that" and before "interact" delete [is]

Col. 8, ln. 29: after "through" change "a" to --an--

Col. 9, ln. 23: after "now" and before "FIG. 5" insert --to--

Col. 11, ln. 51: after "control" change "structure" to --structures--

Col. 12, ln. 33: before "with the" change "associate" to --associated--

Col. 12, ln. 67: before "the cooperation" change "effecting" to --affecting--

Col. 13, ln. 47: after "only as " change "illustrated" to --illustrative--

Signed and Sealed this

Sixteenth Day of January, 2001

Attest:

Q. TODD DICKINSON

*Attesting Officer*  *Commissioner of Patents and Trademarks*